(12) United States Patent
Price et al.

(10) Patent No.: US 10,479,898 B2
(45) Date of Patent: Nov. 19, 2019

(54) COATING COMPOSITION FOR SUBSTRATES IMMERSED IN WATER

(71) Applicant: Akzo Nobel Coatings International B.V., Arnhem (NL)

(72) Inventors: Clayton Price, Whitley Bay (GB); Lyndsey Tyson, Gosforth (GB); Andrew Donoghue, Felling (GB); Alistair Andrew Finnie, Whitley Bay (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 16/069,978

(22) PCT Filed: Jan. 17, 2017

(86) PCT No.: PCT/EP2017/050850
§ 371 (c)(1),
(2) Date: Jul. 13, 2018

(87) PCT Pub. No.: WO2017/125368
PCT Pub. Date: Jul. 27, 2017

(65) Prior Publication Data
US 2019/0023909 A1     Jan. 24, 2019

(30) Foreign Application Priority Data
Jan. 20, 2016   (EP) ..................................... 16152085

(51) Int. Cl.
| C09D 5/16 | (2006.01) |
| C09D 133/06 | (2006.01) |
| C09D 7/20 | (2018.01) |
| C08F 220/38 | (2006.01) |
| C09D 133/14 | (2006.01) |
| C08K 5/00 | (2006.01) |

(52) U.S. Cl.
CPC .......... C09D 5/1662 (2013.01); C08F 220/38 (2013.01); C09D 5/16 (2013.01); C09D 5/1618 (2013.01); C09D 5/1625 (2013.01); C09D 7/20 (2018.01); C09D 133/06 (2013.01); C09D 133/14 (2013.01); *C08F 2220/387* (2013.01); *C08K 5/0058* (2013.01)

(58) Field of Classification Search
None
See application file for complete search history.

(56) References Cited

U.S. PATENT DOCUMENTS

| 3,671,502 A | * | 6/1972 | Samour ................. C08F 220/28 |
| | | | 526/212 |
| 2008/0181861 A1 | | 1/2008 | Jiang et al. |
| 2009/0155335 A1 | | 6/2009 | O'Shaughnessey et al. |
| 2011/0144217 A1 | * | 6/2011 | Finnie ...................... C09D 5/16 |
| | | | 514/772.3 |
| 2011/0195104 A1 | | 8/2011 | Jiang et al. |

FOREIGN PATENT DOCUMENTS

| EP | 0 204 456 A1 | 12/1986 |
| EP | 0 231 038 A1 | 8/1987 |
| EP | 0 646 630 A1 | 4/1995 |
| EP | 0 779 304 A1 | 6/1997 |
| EP | 0 802 243 A1 | 10/1997 |
| EP | 1 006 156 A1 | 6/2000 |
| EP | 1 138 725 A1 | 10/2001 |
| EP | 1 753 829 B1 | 3/2008 |
| EP | 1 534 760 B1 | 9/2012 |
| EP | 2 313 466 B1 | 10/2013 |
| GB | 1 457 590 A | 12/1976 |
| GB | 2 273 934 A | 7/1994 |
| JP | 6-128501 A | 5/1994 |
| JP | 7-258342 A | 10/1995 |
| JP | 8-027225 A | 1/1996 |
| JP | 8-109221 A | 4/1996 |
| WO | 2002/02698 A1 | 1/2002 |
| WO | 2004/018533 A1 | 3/2004 |
| WO | 2005/005516 A1 | 1/2005 |
| WO | 2005/075581 A1 | 8/2005 |
| WO | 2009/067562 A1 | 5/2009 |
| WO | 2009/067565 A2 | 5/2009 |
| WO | 2010/018144 A1 | 2/2010 |
| WO | 2011/156589 A2 | 12/2011 |
| WO | 2015/012148 A1 | 1/2015 |
| WO | 2016/012472 A1 | 1/2016 |

\* cited by examiner

*Primary Examiner* — Robert T Butcher
(74) *Attorney, Agent, or Firm* — McDonnell Boehnen Hulbert & Berghoff LLP

(57) ABSTRACT

The invention relates to a coating composition comprising a) seawater-hydrolyzable groups covalently linked to a polymer backbone, which seawater-hydrolyzable groups are capable of undergoing hydrolysis or ion-exchange when exposed to sea-water, rendering the polymer partially soluble or dispersible in seawater, and b) zwitterionic groups covalently linked to a polymer backbone wherein the polymer backbones to which the sea-water-hydrolyzable groups and the zwitterionic groups are attached serve as a film-forming binder in the coating composition, and wherein the molar ratio of the seawater-hydrolyzable groups a) to the zwitterionic groups b) is 0.1 or higher. The invention also relates to a method of providing a substrate with anti-fouling performance and to a coated substrate.

10 Claims, No Drawings

COATING COMPOSITION FOR SUBSTRATES IMMERSED IN WATER

This application is the U.S. national phase under 35 U.S.C. § 371 of international application PCT/EP2017/050850, filed Jan. 17, 2017, which claims priority to European application 16152085.3, filed Jan. 20, 2016.

The invention relates to a coating composition suitable for substrates immersed in water, to a method providing a substrate with antifouling performance in an aqueous environment, and to a coated substrate.

Man-made structures such as boat hulls, buoys, aquaculture cages, drilling platforms, oil production rigs, and pipes which are immersed in water are prone to fouling by aquatic organisms such as green and brown algae, barnacles, mussels, and the like. Such structures are commonly made of metal, but may also comprise other structural materials such as concrete or plastic. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use anti-fouling paint, for instance as a top coat on ships' hulls, to inhibit the settlement and growth of marine organisms such as barnacles and algae, generally by release of a biocide for the marine organisms.

Many successful anti-fouling paints in former years have been "self-polishing copolymer" paints based on a polymeric binder to which biocidal tri-organotin moieties are chemically bound and from which the biocidal moieties are gradually hydrolyzed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the paint layer on the ship is washed out or eroded. Such paint systems are described for example in GB 1457590 A. As the use of tri-organotin has been restricted by legislation and has become prohibited world-wide, various alternative anti-fouling coating materials have been proposed that can be used in anti-fouling compositions.

Self-polishing paints for anti-fouling end use comprising polymers comprising seawater-hydrolyzable groups pendant to the polymer back bone are known in the prior art, including non-metal salt groups, metal salt groups and silyl ester groups.

GB 2273934 A describes hydrolysable polymeric binders comprising quaternary ammonium groups bound to a polymeric backbone. Such a polymeric binder is prepared by co-polymerization of halide-capped quaternary ammonium monomers of which one of the R groups has a (meth) acrylamide functionality. These polymeric binders are partially soluble in seawater due to the halide-capped quaternary ammonium groups.

WO 2004/018533 describes an antifouling coating composition comprising an ingredient having marine biocidal properties and a polymer comprising quaternary ammonium groups and/or quaternary phosphonium groups bound to the backbone of the polymer, said quaternary ammonium groups and/or quaternary phosphonium groups being neutralized by counter-ions, wherein the counter-ions consist of the anionic residue of an acid having an aliphatic, aromatic, or alkaryl hydrocarbon group comprising 6 or more carbon atoms.

WO2005/075581 relates to the use of a polymer including salts of amine-functional groups and/or salts of phosphine-functional groups bound (pendant) to the backbone of the polymer, said salts including as counter-ion the anionic residue of an acid having an aliphatic, aromatic, or alkaryl hydrocarbon group comprising at least 5 carbon atoms in antifouling compositions.

WO2010/018144 describes a film-forming polymer with improved chemical stability in antifouling coating applications, said polymer bearing pendant to its backbone a salt of (i) a basic group with a first pKa of the conjugate acid of at least 4.0 and (ii) a monofunctional organic acid with a first pKa of 2.0 or less; said basic group being covalently bonded to the polymer backbone.

Self-polishing paints for anti-fouling end use comprising polymers comprising seawater-hydrolyzable metal salt groups pendant to the polymer back bone are described for example in EP-A-204 456, EP-A-779 304, EP-A-1 138 725, and EP-A-1 006 156. Self-polishing paints for anti-fouling end use comprising polymers comprising seawater-hydrolyzable silyl ester groups pendant to the polymer back bone are described for example in EP-A-646 630, EP-A-802 243, and WO2015/012148.

There is a need for further antifouling paints having low toxicity, reduced environmental impact and improved antifouling performance.

The invention provides a coating composition comprising
a) seawater-hydrolyzable groups covalently linked to a polymer backbone, which seawater-hydrolyzable groups are capable of undergoing hydrolysis or ion-exchange when exposed to seawater, rendering the polymer partially soluble or dispersible in seawater, and
b) zwitterionic groups covalently linked to a polymer backbone
wherein the polymer backbones to which the sea-water-hydrolyzable groups and the zwitterionic groups are attached serve as a film-forming binder in the coating composition, and
wherein the molar ratio of the seawater-hydrolyzable groups a) to the zwitterionic groups b) is 0.1 or higher.

It has been found that the coating composition of the invention provides improved anti-fouling performance of substrates coated with the composition and subsequently immersed in water. Alternatively, it is possible to achieve a required level of anti-fouling performance with a lower amount of ingredients having marine biocidal properties.

The coating composition comprises seawater-hydrolyzable groups which are covalently linked to a polymer backbone. Seawater hydrolyzable groups are groups which are capable of undergoing a reaction such as a hydrolysis or ion-exchange reaction when exposed to sea-water. Such a reaction renders the polymer partially soluble or dispersible in sea-water and confers so-called self-polishing properties to the paint layer which comprising such a polymer.

Typically, the sea-water-hydrolyzable groups are selected from the group consisting of non-metal salt groups, metal salt groups, silyl ester groups, and mixtures thereof. Preferably, the sea-water-hydrolyzable groups are selected from the group consisting of non-metal salt groups, metal salt groups and mixtures thereof.

Examples of suitable non-metal salt groups are quaternary phosphonium- or ammonium groups covalently linked to a polymeric backbone wherein the counter ion is a halide ion or a carboxylate ion. Alternatively, acid groups, such as carboxylic acid groups, may be covalently linked to a polymer backbone with quaternary phosphonium- or ammonium groups as counter-ions. Non-metal salt groups covalently linked to polymer backbones are described in more detail in GB 2273934 A, WO 2002/02698, WO 2004/018533, WO2005/075581 and WO2010/018144.

Metal salt groups typically refer to carboxylate groups covalently linked to a polymeric backbone, where the carboxylate group is complexed with or ionically paired with a metal ion. Typically, the metal is copper or zinc. Metal salt groups covalently linked to polymer backbones are described in more detail in EP-A-204 456, EP-A-779 304, EP-A-1 138 725, and EP-A-1 006 156.

Silyl ester groups may also be used sea-water-hydrolyzable groups. Silyl ester groups covalently linked to polymer backbones are described in more detail in EP-A-646 630, EP-A-802 243, WO2005/005516 and WO2015/012148. The coating composition further comprises zwitterionic groups covalently linked to a polymer backbone. As used herein "zwitterionic group" means a moiety containing covalently linked cationic and anionic (charged) substituents in equal proportions, so that the moeity is net neutral overall. Recently attention has been directed to coatings which contain non-polymeric molecules that comprise zwitterionic groups. Such species can be effective at preventing non-specific protein adhesion and whole organism fouling but, as a flip-side to these effects, zwitterionic groups are highly hydrophilic and so these molecules thus have a tendency to dissolve too rapidly in water. The prior art has been concerned with immobilizing the zwitterionic moieties within anti-fouling and fouling resistant coatings, and in incorporating said moieties into copolymers. US 2008/181861 A describes a substrate, such as a ship's hull, having a low fouling surface, said surface comprising a monolayer of a sulfobetaine or a carboxybetaine material. In an embodiment, the sulfobetaine material is a well-defined diblock copolymer comprising a poly(sulfobetaine) and poly(propylene oxide).

As mentioned above, the sea-water hydrolyzable groups and the zwitterionic groups are covalently linked to a polymer backbone according to the current invention. Suitable types of polymer backbones are those commonly used as film-forming binders in coating compositions, for examples polyesters, polyurethanes, and polyacrylates. The polymer backbones may be linear or branched. Polyacrylate polymer backbones are preferred. The expression "polyacrylate" as used herein is intended to encompass polymers and copolymers based on ethylenically unsaturated polymerizable monomers, such as acrylates, methacrylates, unsaturated amides, vinylaromatics, and vinylesters.

In the coating composition the molar ratio of sea-water-hydrolyzable groups a) to zwitterionic groups b) is important. On average at least 1 sea-water hydrolyzable group is present for 10 zwitterionic groups. Hence, the ratio of sea-water-hydrolyzable groups a) to zwitterionic groups b) is at least 0.1. In a preferred embodiment, the ratio is at least 0.5. Generally, the ratio does not exceed 50.0, preferably the ratio is 20.0 or lower. Typically, the ratio of sea-water-hydrolyzable groups a) to zwitterionic groups b) ranges from 0.2 to 30.0, preferably from 1.0 to 20.0.

In one embodiment, the sea-water-hydrolyzable groups and the zwitterionic groups are covalently linked to the same polymer backbone. Alternatively, they may be linked to different polymer backbones.

Generally, the average number of sea-water-hydrolyzable groups plus the zwitterionic groups linked to a polymer backbone is at least 2, preferably at least 4.

For organic solvent based coating compositions, the number average molecular weight of the polymers carrying the sea-water-hydrolyzable groups and/or the zwitterionic groups is generally in the range of 1000 to 100000, and preferably 1500 to 50000. The weight average molecular weight typically is in the range of 1500 to 250000, preferably 2500 to 40000. The number average and weight average molecular weight can be determined by gel permeation chromatography.

The polymer backbones to which the sea-water-hydrolyzable groups and the zwitterionic groups are attached serve as a film-forming binder in the coating composition.

When the polymer backbone is a polyacrylate, non-metal salt groups can be introduced by using non-metal salt group containing monomers. Representative cationic monomers include the quaternary or acid salts of dialkylaminoalkyl (meth)acrylates; the quaternary or acid salts of dialkylaminoalkyl(meth)acrylamides; N,N-diallyldialkyl ammonium halides and, Mannich products. In such monomers, where applicable, the alkyl groups present will generally be $C_{1-12}$ alkyl and more usually $C_{1-4}$ alkyl. Further suitable examples include: N,N-dimethylaminoethylacrylate; methyl chloride quaternary salt (DMAEA.MCQ) and diallyldimethylammonium chloride (DADMAC); (3-methacryloylamido)propyl trimethylammonium halide salt; (3-acryloylamido)propyl trimethylammonium halide salt; (3-methacryloylamido)propyl trimethylammonium sulfonate salt, (3-acryloylamido) propyl trimethylammonium sulfonate salt, (3-methacryloyl) propyl trimethylammonium sulfonate salt, (3-acryloyl) propyl trimethylammonium sulfonate salt, where in each case the sulfonate salt is, for example, an alkyl-, aryl- or aralkyl sulfonate salt, such as a dodecylbenzene sulfonate salt.

Representative anionic monomers include: amine or phosphine salts of polymerizable unsaturated carboxylic or sulphonic acids such as (meth)acrylic acid, maleic or itaconic acid; 2-acrylamido-2-methyl propane sulfonic acid; sulfopropyl (meth)acrylate; sulphomethyl acrylamide; allyl sulphonic acid; and vinyl sulphonic acid.

Metal salt groups can be introduced by using metal salt group containing monomers. Representative monomers containing metal salt groups include zinc acrylate $[(CH_2\!\!=\!\!CHCOO)_2Zn]$, zinc methacrylate $[(CH_2\!\!=\!\!C(CH_3)COO)_2Zn]$, copper acrylate $[(CH_2\!\!=\!\!CHCOO)_2Cu]$, and copper methacrylate $[(CH_2\!\!=\!\!C(CH3)COO)_2Cu]$, zinc octanoate (meth)acrylate, copper octanoate (meth)acrylate, zinc versatate (meth)acrylate, copper versatate (meth)acrylate, zinc palmitate (meth)acrylate, copper palmitate (meth) acrylate, zinc naphthenate (meth)acrylate, copper naphthenate (meth)acrylate. Such monomers may be used either singly or as a mixture of two or more of them as required.

Alternatively, metal salt groups can be introduced by first polymerizing a polymerisable unsaturated acid to form a polymer having pendant acid groups covalently linked to its polymeric backbone. In such cases, the polymerisable unsaturated acid acts as a precursor monomer. Suitable metal salt groups may then be formed by subsequent modification of this polymer following the procedures described in EP-A-204 456, for example by reaction of the polymer with a monovalent organic acid and an inorganic metal salt, such as a metal oxide, hydroxide, sulfide or chloride, or by reaction of the polymer with a monovalent organic acid and a monovalent organic acid ester. Typically, the polymerisable unsaturated acid is a carboxylic acid such as acrylic or methacrylic acid. Examples of inorganic metal salts include copper or zinc oxide, hydroxide, sulfide or chloride. Typically the monovalent organic acid is a carboxylic acid such as octanoic acid, versatic acid, palmitic acid, naphthenic acid, abietic acid, rosin or a modified rosin such as a hydrogenated rosin. The monovalent organic acid ester is typically copper acetate or zinc acetate.

The silyl ester group is typically a triorganosilyl carboxylate ester, such as a trialkylsilyl, triarylsilyl or alkyldiarylsilyl carboxylate ester. Silyl ester groups can be introduced by using silyl ester group containing monomers, for example triisopropylsilyl (meth)acrylate, triisobutylsilyl (meth)acrylate, triphenylsilyl (meth)acrylate and t-butyldiphenylsilyl (meth)acrylate.

The monomer having seawater hydrolyzable groups, or the precursor monomer, is typically copolymerized with other ethylenically unsaturated monomers to form a copolymer. Examples of suitable further monomers are described further below.

When the polymer backbone is a polyacrylate, the zwitterionic groups can be introduced by using zwitterionic monomers. Such zwitterionic monomers are typically selected from monomers of Formula A, monomers of Formula B or mixtures thereof;

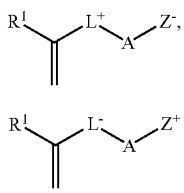

wherein: $R^1$ is hydrogen or methyl;

$L^+$ is an aliphatic, alicyclic or aromatic divalent group comprising up to 40 carbon atoms and a cation selected from N+, P+ and S+;

$L^-$ is a group of formula

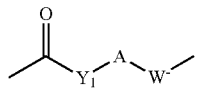

A is an alkyl, alkenyl, alkynyl, aryl or aralkyl group having up to 16 carbon atoms, $W^-$ is

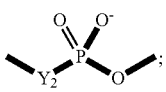

$Y_1$ and $Y_2$ are independently selected from O or $NR^2$;
$Z^-$ is $CO_2^-$, or $SO_3^-$ or

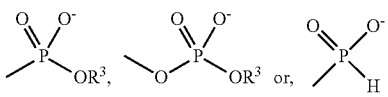

$Z^+$ is $-N^+R^4R^5R^6$, $-P^+R^4R^5R^6$ or $-S^+R^4R^5$, and,
$R^2$, $R^3$, $R^4$, $R^5$ and $R^6$ are independently selected from hydrogen, $C_6$-$C_{20}$ aryl, $C_7$-$C_{20}$ aralkyl and $C_1$-$C_{20}$ alkyl.

Preferably in Formula A above, $L^+$ is a group of formula

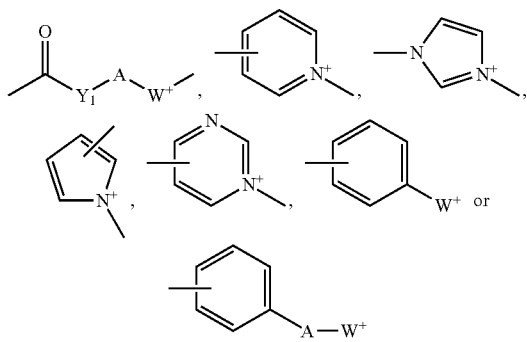

in which: A is an alkyl, alkenyl, alkynyl, aryl or aralkyl group having up to 16 carbon atoms, and,
$W^+$ is $-S^+R^7-$, $-N^+R^8R^9-$, or $-P^+R^8R^9-$,
wherein: $R^7$, $R^8$ and $R^9$ are independently selected from hydrogen, $C_1$-$C_{20}$ alkyl, $C_6$-$C_{20}$ aryl and $C_7$-$C_{20}$ aralkyl, and preferably are independently selected from $C_1$-$C_6$ alkyl.

Exemplary monomers of Formula A include but are not limited to: dimethyl-methacryloyloxyethyl-sulfopropyl ammonium betaine (sulfobetaine methacrylate available from Raschig GmbH as Ralumer SPE); sulfopropylvinylpyridinium betaine (available from Raschig GmbH as Ralumer SPV); dimethylmethacrylamidosulfopropyl ammonium betaine (available from Sigma Aldrich), and methacryloyloxyethyl dimethylammonium propionate.

An exemplary monomer of Formula B is 2-methacryloyloxyethylphosphorylcholine (available as Lipidure™ PC from NOF Corporation).

The zwitterionic monomer is typically copolymerized with other non-zwitterionic ethylenically unsaturated monomers to form a copolymer having zwitterionic groups covalently linked to the polymer backbone.

Polyacrylate polymers useful in the coating composition of the present invention are typically copolymers that have zwitterionic groups, seawater hydrolyzable groups, and further ethylenically unsaturated monomers. These maybe prepared by the polymerization of ethylenically unsaturated monomers having zwitterionic groups, ethylenically unsaturated monomers having seawater hydrolyzable groups and other ethylenically unsaturated monomers. Ethylenically unsaturated monomers having zwitterionic groups, ethylenically unsaturated monomers having seawater hydrolyzable groups and other ethylenically unsaturated monomers groups may be copolymerized to form a single copolymer for use in the coating compositions of the present invention. Alternatively, ethylenically unsaturated monomers having zwitterionic groups, ethylenically unsaturated monomers having seawater hydrolyzable groups and other ethylenically unsaturated monomers may be copolymerised to form two or more copolymers which are combined for use in the coating compositions of the present invention. For example, a copolymer prepared from ethylenically unsaturated monomers having zwitterionic groups and other ethylenically unsaturated monomers may be combined with a copolymer prepared from ethylenically monomers having seawater hydrolyzable groups and other ethylenically unsaturated monomers.

As a further alternative, the ethylenically unsaturated monomers having seawater hydrolyzable groups may be replaced by precursor monomers in the above copolymerization procedures and seawater hydrolysable groups may then be formed by subsequent modification of the resulting copolymers.

Methods for preparing copolymers having zwitterionic groups covalently linked to the polymer backbone are described in more detail in International patent application No. PCT/EP2015/066701.

Generally, the sum of the monomers having zwitterionic groups and the monomers having seawater hydrolyzable groups adds up to 2 to 80 mol-%, typically 4 to 60 mol-%, and preferably 5 to 50 mol-%, based on the total monomers of the polymer backbone or backbones to which the zwitterionic groups and seawater hydrolyzable groups are covalently linked.

The remainder of the monomers is made up of other monomers. Exemplary non-ionic ethylenically unsaturated monomers may be selected from the group of alkyl (meth) acrylate esters; aralkyl (meth)acrylate esters; alkyl (meth) acrylate esters; hydroxyalkyl (meth)acrylate esters; polyalkylene glycol mono(meth)acrylates; alkoxyalkyl (meth) acrylates; mono (meth)acrylates of (polyalkylene) glycol monoalkyl, alkylene and alkyne ethers or esters; (meth) acrylic acids; (meth)acrylonitrile; (meth)acrylamide and derivatives thereof; vinylic monomers such as styrene, vinyl esters; vinyl amides; vinyl ethers, vinyl pyrrolidone, and, vinyl halides. Suitable alkyl and hydroxyalkyl esters of acrylic acid and methacrylic acid are those derived from $C_1$ to $C_{14}$ alcohols and thereby include as non-limiting examples: methyl (meth)acrylate; ethyl (meth)acrylate; isopropyl (meth)acrylate; n-propyl (meth)acrylate; n-butyl (meth)acrylate; isobutyl (meth)acrylate; tert-butyl (meth) acrylate; cyclohexyl (meth)acrylate; 2-ethylhexyl (meth) acrylate; isobornyl (meth)acrylate; 4-tert-butylcyclohexyl (meth)acrylate; isodecyl (meth)acrylate; lauryl (meth)acrylate, 2-hydroxyethyl acrylate; hydroxyethyl methacrylate; hydroxypropyl (meth)acrylate; 2-hydroxybutyl methacrylate; methoxyethyl (meth)acrylate and, di(meth)acrylate esters of alkane diols such as 1,4-butanediol diacrylate and 1,6-hexane diol diacrylate.

Macro-monomers bearing terminal (meth)acrylate groups may also be included. Useful macro-monomers may have a molecular weight of up to 5000 daltons. Poly(ethyleneglycol) mono-methacrylates, such as Bisomer MPEG350MA (available from GEO Specialty Chemicals) may be mentioned as suitable examples of such macro-monomers.

Suitable derivatives of (meth)acrylamide include N-methyl(meth)acrylamide, N,N-dimethyl(meth)acrylamide, N-isopropyl(meth)acrylamide, N-(2-hydroxypropyl) methacrylamide, and N-methylolacrylamide.

Suitable vinyl esters include vinyl acetate, vinyl propionate, vinyl versatate, vinyl caprolate and vinyl laurate.

Suitable vinyl amides may be cyclic or acyclic and thus include, but are not limited to: N-vinyl-2-pyrrolidone; alkylated N-vinyl-2-pyrrolidones; N-vinyl acetamide; N-propenylacetamide; N-(2-methylpropenyl)acetamide; N-vinyl formamide; N-(2,2-dichloro-vinyl)-propionamide; N-ethenyl acetamide; N-vinyl-N-methyl acetamide; and, N-vinyl-N,N-propyl propionamide.

Suitable vinyl monomers include: $C_4$-$C_8$ dienes such as 1,3-butadiene; isoprene; styrene; t-butylstyrene; isopropylstyrene; divinyl benzene; heterocyclic vinyl compounds; and, vinyl halides such as chloroprene. Preferably the vinyl monomers include ethylene, styrene, butadiene and isoprene.

The monomers may be polymerized by the well-known free-radical polymerization of the above-mentioned ethylenically unsaturated polymerizable monomers. The polymerization can be carried out in one or more stages and in the absence or presence of an organic diluent.

Suitable radical-forming initiators are known in the art, such as di-tert.-butyl peroxide, tert.-butyl peroxy benzoate, tert.-butyl peroxy-2-ethyl hexanoate, tert.-butyl peroxy-3,5,5-trimethyl hexanoate, and the like, and azo initiators such as 2,2'-azo-bis(2-methylbutyronitrile) and 2,2'-azo-bis (isobutyronitrile). If so desired, the molecular weight of the polymers can be controlled by the ratio of monomers to initiators and by chain transfer agents. Examples of suitable chain transfer agents include n-octyl mercaptan, n-dodecyl mercaptan, tert.-dodecyl mercaptan, mercaptoethanol, mercaptopropionic acid, and thioglycol. Advanced polymerization techniques, such as group transfer polymerization (GTP), atom transfer radical polymerization (ATRP), and reversible addition fragmentation chain transfer (RAFT) polymerization, can also be used.

The coating composition generally is a liquid coating composition. It usually comprises a liquid volatile diluent. The volatile diluent may be water. Alternatively, the volatile diluent may be an organic solvent, or a mixture of solvents. The volatile diluent may be, for example, an aromatic hydrocarbon such as xylene, toluene or trimethylbenzene, an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, water, or a mixture of two or more of these. Typically, the coating composition will comprise volatile diluent in an amount ranging from about 5 to 70% by weight.

Additives that can be added to the coating composition include reinforcing agents, stabilizers, thixotropes or thickening agents, plastizisers, liquid carriers and non-biocidal pigments.

The coating composition according to the present invention can include a polymeric or non-polymeric plasticizer. Such a plasticizer can for example be present at up to 50% by weight based on the total binder polymer, generally at least 10% and up to 35% by weight based on the binder polymer. Examples of such plasticizers are phthalate esters such as dibutyl phthalate, butyl benzyl phthalate or dioctyl phthalate, di-isononyl phthalate, phosphate triesters such as tricresyl or tris(isopropyl)phenyl phosphate, or chlorinated paraffins or sulphonamides such as N-substituted toluene sulphonamide.

The coating composition may also comprise other polymers, resins, and film forming binders. Such materials are generally known to the skilled person. Rosin and rosin derivatives such as limed rosin maleinated rosin, fumarated rosin, copper rosinate, zinc rosinate, or hydrogenated, disproportionated or polymerized rosin and copper or zinc salts thereof may be mentioned as an example of such an ingredient.

Examples of non-biocidal pigments that can be added to the coating composition are slightly seawater-soluble non-biocides such as zinc oxide and barium sulphate and seawater-insoluble non-biocides such as fillers and coloring pigments, e.g., titanium dioxide, ferric oxide, phthalocyanine compounds, and azo pigments. Such highly insoluble pigments are preferably used at less than 60% by weight of the total pigment component of the paint, most preferably less than 40%.

Examples of suitable reinforcing agents that can be added to coating composition are fibres, e.g., carbide fibres, silicon-containing fibres, metal fibres, carbon fibres, sulphide fibres, phosphate fibres, polyamide fibres, aromatic polyhydrazide fibres, aromatic polyester fibres, cellulose fibres, rubber fibres, acrylic fibres, polyvinylchloride fibres, and polyethylene fibres. Preferably, the fibres have an average length of 25 to 2,000 microns and an average thickness of 1 to 50 microns with a ratio between the average length and the average thickness of at least 5.

Examples of suitable stabiliser agents are moisture scavengers, zeolites, aliphatic or aromatic amines such as dehydroabietylamine, tetraethylorthosilicate, and triethyl orthoformate.

Examples of suitable thixotropes or thickening agents are silicas, bentones, and polyamide waxes.

The coating composition suitably comprises an ingredient having marine biocidal properties. The ingredient having marine biocidal properties usually is a biocide for aquatic organisms. This biocide can be mixed with the polymers and additives using conventional paint-blending techniques. When the ingredient having marine biocidal properties is a pigment, it can be all or part of the pigment of the paint. The coating composition preferably has a pigment volume concentration of, for example, 30 to 60%. The ingredient having marine biocidal properties can be one or more of an inorganic, organometallic, metal-organic or organic biocide for marine or freshwater organisms. Examples of inorganic biocides include copper metal and copper salts such as copper oxide, copper thiocyanate, copper bronze, copper carbonate, copper chloride, copper nickel alloys, and silver salts such as silver chloride or nitrate; organometallic and metal-organic biocides include zinc pyrithione (the zinc salt of 2-pyridinethiol-1-oxide), copper pyrithione, bis (N-cyclohexyl-diazenium dioxy) copper, zinc ethylene-bis(dithiocarbamate) (i.e. zineb), zinc dimethyl dithiocarbamate (ziram), and manganese ethylene-bis(dithiocarbamate) complexed with zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl) pyridine, 2-methylthio-4-butylamino-6-cyclopopylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroisophthalonitrile, tolylfluanid, dichlofluanid, diiodomethyl-p-tosylsulphone, capsciacin, N-cyclopropyl-N'-(1,1-dimethylethyl)-6-(methylthio)-1,3,5-triazine-2,4-diamine, 3-iodo-2-propynylbutyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethyl pyrrole (tralopyril), and a furanone, such as 3-butyl-5-(dibromomethylidene)-2(5H)-furanone, and mixtures thereof, macrocyclic lactones such as avermectins, for example avermectin B1, ivermectin, doramectin, abamectin, amamectin and selamectin, and quaternary ammonium salts such as didecyldimethylammonium chloride and an alkyldimethylbenzylammonium chloride.

Furthermore, the biocide may optionally be wholly or partially encapsulated, adsorbed or supported or bound. Certain biocides are difficult or hazardous to handle and are advantageously used in an encapsulated or absorbed or supported or bound form. Additionally, encapsulation, absorption or support or binding of the biocide can provide a secondary mechanism for controlling biocide leaching rate from the coating system in order to achieve an even more gradual release and long lasting effect.

The coating composition of the present invention is very suitable for providing a substrate with anti-fouling properties in an aqueous environment. Therefore, the invention also relates to a method of providing a substrate with anti-fouling performance in an aqueous environment comprising the steps of
  a) Applying the coating composition according to the invention to the substrate,
  b) Allowing the coating composition to cure to form a coating layer, and
  c) Locating the coated substrate in an aqueous environment.

Preliminary anticorrosive layer(s), intermediate adhesion promoting layer(s) and topcoats where required, together with the coating composition according to the invention, can be applied by methods well known in the art, including but not limited to brushing, spraying, dipping and rolling.

Examples of typical substrates include the hulls and other surfaces of ships and boats, offshore marine structures such as oil and gas productions and storage rigs, drilling platforms, sea water conduit systems, pipes, buoys, heat exchangers, cooling towers, desalination equipment, filtration membranes, fish farms or parts thereof, and docks.

The invention further relates to a substrate having a surface to be at least partly immersed in water, wherein the surface to be immersed in water is coated with a coating composition according to the invention.

The invention will be elucidated with reference to the following examples. These are intended to illustrate the invention but are not to be construed as limiting in any manner the scope thereof.

Preparation of monomer with seawater hydrolysable functionality (MATMA-DBSA)

Dimethylaminopropyl methacrylamide (192.1 g), dimethylcarbonate (179.6 g) and methanol (208 g), were placed in a stainless steel, high pressure reaction vessel. The sealed vessel was heated to 125° C. for 4 hours. The cooled solution was filtered and dried in vacuo after addition of methanol (150 g).

The resulting viscous amber liquid, trimethylaminopropyl methacrylamide (244.7 g) was diluted with xylene (200 g) and placed in a 2 L round bottom flask. To this was added at room temperature with stirring over 30 minutes a solution of dodecylbenzenesulphonic acid (244.7 g) in xylene (200 g), and stirring was continued overnight to provide a solution of 3-(methacrylamidopropyl) trimethylammonium dodecylbenzenesulfonate (MATMA-DBSA) in xylene.

EXAMPLE 1

Preparation of a Polymer Having Zwitterionic Groups and Sea-Water Hydrolyzable Groups Covalently Linked to the Polymer Backbone To a polymerisation reaction vessel containing Xylene: Butanol at 85° C. [143.7 g Xylene: 143.7 g Butanol] was added dropwise, with mechanical stirring, two monomer feed solutions.

Feed solution 1: A solution of monomers consisting of, MATMA-DBSA (solid) (474.47 g, of solution @ 52.69% solids in 1:1 Xylene Butanol), 0.49 moles, Ralumer SPE 41.28 g, 0.16 moles.

Feed solution 2: Butylmethacrylate (BMA) 371.19 g, 2.61 moles, and 2,2'-azodi(2-methylbutyronitrile) (AMBN) initiator 12.55 g, 0.06 moles in 112.95 g (1:1 Xylene:Butanol, ~10 wt %).

Both monomer feeds were added simultaneously using a Watson-Marlow peristaltic pump at a rate such that the addition took 5 h. Once the addition of the feed was complete the temperature was increased to 95 degrees C., the AMBN (boost) (6.27 g, 0.03 moles) was added (in 56.43 g Xylene:Butanol (1:1)) and the reaction was held for 2 h. The cooled viscous polymer solution, was placed in a storage vessel.

The molar ratio of sea-water-hydrolyzable groups to zwitterionic groups is 3.0.

EXAMPLE A

Preparation of a Polymer with Sea-Water Hydrolyzable Groups Covalently Linked to the Polymer Backbone, but No Zwitterionic Groups To a polymerisation reaction vessel containing Xylene: Butanol at 85 degrees C. [123.72 g Xylene: 123.72 g Butanol] was added dropwise, with mechanical stirring, a solution of monomers consisting of, MATMA-DBSA (solid) (474.47 g, of solution@52.69% solids in 1:1 Xylene Butanol), 0.49 moles, BMA 278.39 g, 1.96 moles, and AMBN initiator 4.71 g, 0.02 moles in 42.39 g (1:1 Xylene:Butanol, ~10 wt %).

The monomer feed was added using a Watson-Marlow peristaltic pump at a rate such that the addition took 5 h. Once the addition of the feed was complete the temperature was increased to 95 degrees C., the AMBN (boost) (2.35 g, 0.01 moles) was added (in 21.15 g Xylene:Butanol (1:1)) and the reaction was held for 2 h. The cooled viscous, was placed in a storage vessel.

EXAMPLE 2

According to the Invention

Preparation of a Marine Antifouling Coating Composition According to the Invention Comprising the Polymer Prepared in Example 1.

The antifouling coating composition was prepared by mixing the materials listed in Table 1 in the stated amounts by weight using a high speed disperser to form a fouling-control paint.

TABLE 1

| Name | Description | Wt % |
| --- | --- | --- |
| Polymer solution of Example 1 | Binder | 11.5 |
| Chlorinated paraffin (Cereclor 48, Ineos Chlor) | Plasticiser | 5 |
| Copper pyrithione (Lonza) | Biocide | 4 |
| Iron Oxide (Bayferrox 130BM) | Pigment | 7 |
| Zinc Oxide (Larvik) | Pigment | 12 |
| Copper Oxide (American Chemet) | Biocide | 40 |
| Polyamide wax (Disparlon (A600-020X, Kusomoto Chemicals)) | Thixotrope | 2 |
| Xylene | Solvent | 7 |

EXAMPLE B

Comparative

Comparative Antifouling Coating Composition Comprising the Polymer Prepared in Example A.

The antifouling coating composition was prepared by mixing the materials listed in Table 2 in the stated amounts by weight using a high speed disperser to form a fouling-control paint.

TABLE 2

| Name | Description | Wt % |
| --- | --- | --- |
| Polymer solution of Example A | Binder | 11.5 |
| Chlorinated paraffin (Cereclor 48, Ineos Chlor) | Plasticiser | 5 |
| Copper pyrithione (Lonza) | Biocide | 4 |
| Iron Oxide (Bayferrox 130BM) | Pigment | 7 |
| Zinc Oxide (Larvik) | Pigment | 12 |
| Copper Oxide (American Chemet) | Biocide | 40 |
| Polyamide wax (Disparlon (A600-020X, Kusomoto Chemicals)) | Thixotrope | 2 |
| Xylene | Solvent | 7 |

Antifouling Testing

As a test of antifouling performance the paints of Examples 2 and B were each applied to plywood boards which had been pre-painted with a commercial anticorrosive primer and the boards were immersed in the sea in Singapore. The paint films were periodically assessed for settlement of marine fouling organisms and the results are shown in Table 3 below.

In all results quoted below, 0%=Totally clean, 100%=Totally fouled.

TABLE 3

| | Total % coverage of fouling | |
| --- | --- | --- |
| Immersion time | Example 2 | Comparative Example B |
| 50 weeks | 23.0% | 44.2% |

The test results show that a coating composition comprising the polymer according to the invention (Example 2) had substantially better antifouling performance compared to a coating composition comprising the comparison polymer of Example A (Example B).

The invention claimed is:

1. A coating composition comprising
   a) seawater-hydrolyzable groups covalently linked to an acrylic polymer, which seawater-hydrolyzable groups are capable of undergoing hydrolysis or ion-exchange when exposed to seawater, rendering the polymer partially soluble or dispersible in seawater, and
   b) zwitterionic groups covalently linked to the acrylic polymer
   wherein the molar ratio of the seawater-hydrolyzable groups a) to the zwitterionic groups b) is 0.1 or higher,
   wherein the seawater hydrolyzable groups are selected from
   the group consisting of non-metal salt groups, metal salt groups, silyl ester groups, and mixtures thereof, and
   wherein the non-metal salt groups covalently linked to the acrylic polymer are
   selected from the group consisting of quaternary and acid salts of dialkylaminoalkyl(meth)acrylates, quaternary and acid salts of dialkylaminoalkyl(meth)acrylamides, N,N-diallyldialkyl ammonium halide, (3-methacryloylamido)propyl trimethylammonium halide salt; (3-acryloylamido)propyl trimethylammonium halide salt; (3-methacryloylamido)propyl trimethylammonium sulfonate salt, (3-acryloylamido)propyl trimethylammonium sulfonate salt, (3-methacryloyl)propyl trimethylammonium sulfonate salt, (3-acryloyl)propyl trimethylammonium sulfonate salt, and amine and phosphine salts of polymerizable unsaturated carboxylic and sulphonic acids wherein the silyl ester groups covalently linked to the acrylic polymer are selected from the group consisting of triisopropylsilyl (meth)acrylate, triisobutylsilyl (meth)acrylate, triphenylsilyl (meth)acrylate, and t-butyldiphenylsilyl (meth)acrylate.

2. The coating composition according to claim 1, wherein the molar ratio of the seawater-hydrolyzable groups a) to the zwitterionic groups b) is 0.5 or higher.

3. The coating composition according to claim 1, wherein the molar ratio of the seawater-hydrolyzable groups a) to the zwitterionic groups b) is 50.0 or lower.

4. The coating composition according to claim 1, wherein the seawater-hydrolyzable groups a) and the zwitterionic groups b) are covalently linked to the same polymer backbone.

5. The coating composition according to claim 1, wherein the seawater-hydrolyzable groups a) and the zwitterionic groups b) are covalently linked to different polymer backbones.

6. The coating composition according to claim 1, wherein the coating composition further comprise an ingredient having marine biocidal properties.

7. The coating composition according to claim 1, wherein the coating composition is a liquid coating composition comprising a volatile organic solvent.

8. A method of providing a substrate with anti-fouling performance in an aqueous environment comprising
   a) applying the coating composition according to claim 1 to the substrate,
   b) allowing the coating composition to cure to form a coating layer, and
   c) locating the coated substrate in an aqueous environment.

9. A substrate having a surface to be at least partly immersed in water, wherein the surface to be immersed in water is coated with a coating composition according to claim 1.

10. The substrate according to claim 9, wherein the substrate is selected from ship hulls, boat hulls, buoys, drilling platforms, oil or gas production or storage rigs, pipes, and fish farms.

* * * * *